United States Patent [19]

Harrison

[11] 4,076,283
[45] Feb. 28, 1978

[54] EXPANSION JOINT AND SEAL FOR SEWER PIPE

[76] Inventor: George W. Harrison, 2119 Sieber Drive, Houston, Tex. 77017

[21] Appl. No.: 718,419

[22] Filed: Aug. 27, 1976

[51] Int. Cl.² ............................................. F16L 49/00
[52] U.S. Cl. .................................... 285/230; 285/236; 285/397
[58] Field of Search ............... 285/236, 235, 230, 224, 285/225, 288, 229, 302, 223, 397

[56] References Cited

U.S. PATENT DOCUMENTS

| 603,222 | 4/1898 | McLean | 285/235 |
|---|---|---|---|
| 1,829,236 | 10/1931 | Perkins | 285/236 X |
| 2,144,419 | 1/1939 | Slocumb | 285/235 X |
| 2,765,153 | 10/1956 | Gielow et al. | 285/235 X |
| 3,016,161 | 1/1962 | Peplin | 285/236 X |
| 3,070,130 | 12/1962 | Risley | 285/235 X |
| 3,114,568 | 12/1963 | Buono | 285/235 |
| 3,669,471 | 6/1972 | Fetish, Jr. | 285/225 X |
| 3,680,896 | 8/1972 | Cupit | 285/224 X |
| 3,729,939 | 5/1973 | Shimizu | 285/230 X |

FOREIGN PATENT DOCUMENTS 835,239  3/1952  Germany ............................. 285/236

Primary Examiner—Thomas F. Callaghan

[57] ABSTRACT

An Expansion Joint and Seal for Pipe includes an inner or outer seal for such joint, with a suitable sealing means sufficiently flexible to enable expansion of the joint while maintaining desired seal between the two joints.

3 Claims, 3 Drawing Figures

EXPANSION JOINT AND SEAL FOR SEWER PIPE

SUMMARY OF THE INVENTION AND PRIOR ART

The object of the present invention is to provide a new and improved method and apparatus for an expansion joint and seal.

In the past, different types of means have been provided for maintaining seals in expansion joints. Such means have been relatively complicated due to the method of installation of such means, or expensive due to the time, labor and materials necessary to provide such seal means for expansion joints of pipe which expand due to temperature, movement or other causes of the pipe.

IN THE DRAWINGS

DESCRIPTION OF THE INVENTION

Figure 1:
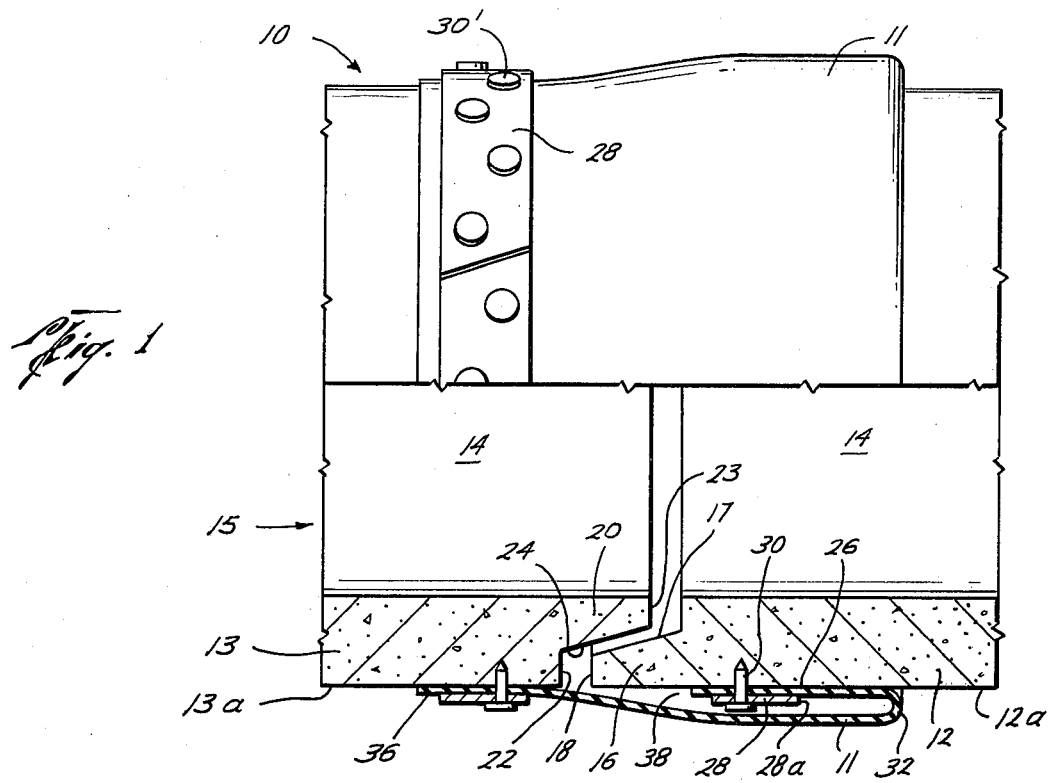
FIG. 1 is a view, partly in section, of a pipe joint including an exteriorly positioned flexible sealing member.

The expansion joint and sealing member or means of the present invention is generally designated by the numeral 10 and is illustrated as including a flexible member 11 secured, as set forth hereinbelow, to a joint of concrete pipes or longitudinal members 12 and 13, each of which are shown and illustrated partly in section.

As is well known, the pipe members 12 and 13 have a longitudinal opening 14 therethrough enabling fluids to flow in the direction of the arrow 15. As further illustrated, member 12 includes a female circumferential end member 16 having an inwardly tapered surface 17 and an end face 18. The conduit 13 includes a male end member 20 having an exteriorly positioned face 22 and an interiorly positioned face 23 with an inwardly tapered section 24 communicating between the faces. Normally the tapered surfaces 17 and 24 and different faces of the female and male ends 16 and 20 of the members 12 and 13 normally abut each other; however, on occasions and for various and different reasons, such as expansion and contraction, the members 12 and 13 may move away from each other, thus creating the problem of spilling of fluids passing therethrough into the area outside the interior 14 of the conduits. It is to be further understood that several members like pipe members 12 and 13 may be connected together end to end to form a continuous line for transmitting such fluids.

As further illustrated in FIG. 1, a flexible member 11 prevents fluid spills and is made of a suitable flexible material such as nylon or neoprene and of a sufficient resistance or hardness to prevent fluids from leaking therethrough. The flexible member 11 is of a sufficient lateral width to extend around the outer diameter of the members 12 and 13 and overlap somewhat and is positioned and secured around and to each of the members 12 and 13 adjacent and over the female and male members 16 and 20 such that when secured, such flexible member 11 forms a seal between the female and male members, 16 and 20, of the members 12 and 13, respectively.

In the operation and installation the sealing material 11 is placed around the exterior of the pipe member 12 in the area 26 of the flexible member 11. A suitable rolled band 28 of a length at least of the outer diameter of the member 12 is positioned over the area 26 of the flexible member 11 and thereafter a plurality of suitable anchors 30 is position around the periphery of the band 28 to securely fasten and seal the band 28 to the flexible member 11 and to the exterior surface 12A of the member 12 adjacent the male member 16.

The flexible member 11 is then turned back, curved or coiled as at 32 back over the band 28 and anchors 30. The material 11 is then wrapped around the periphery of pipe 13 and a suitable metal band 28 of a sufficient length of at least the diameter of the member 13 is sealingly wrapped around the end section 36 of the member 11 and suitable anchors 30 are punched or hammered or otherwise suitably placed through the band 28 into the pipe 13 to securely and sealingly fasten the end section 36 of the material 11 to the member 13 adjacent the male section 20.

When each of the ends 26 and 36 of the flexible material or member 11 are securely fastened to the female and male members 16 and 20, respectively, a sealed closure gap 38 is formed to prevent leakage of fluids. If the pipe joints 12 and 13 should move longitudinally relative to each other, a curved or looped section 32 formed by turning or coiling the member 11 moves or travels relative to the member 12 and 13 but is prevented from extreme movement because such loop 32 is fastened by the end 28A of the steel band 28 secured to the member 12. Normally, such longitudinal movement of the flexible member 11 is designed and constructed to prevent the face 23 of the male end 20 from moving longitudinally past the face 18 of the female end 16 of member 12 and to thereby prevent members 12 and 13 from becoming entirely separated.

Figure 2:
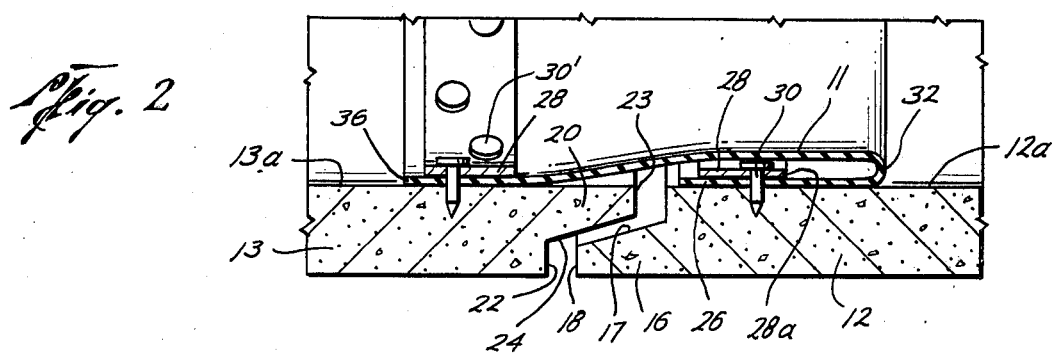
FIG. 2 is a sectional view of expansion pipe joint including an interiorly positioned flexible sealing member.

As illustrated in FIG. 2, members 12 and 13 include the same female and male ends 16 and 20 with the same tapered surfaces 17 and 24 and end faces 22, 18 and 23. However, in this illustration, the flexible member 11 is positioned on the interior surfaces 12A and 13A of the members 12 and 13, respectively. The anchors 30 and 30' retain the metal bands 28 and ends 26 and 36 of flexible member 11 and the curved member 32 of the flexible member 11 is permitted to move longitudinally with conduits 12 and 13 until abutting the end 28' of the band 28 mounted with the member 12 which normally prevents further longitudinal movement of the pipeline members 12 and 13.

Figure 3:
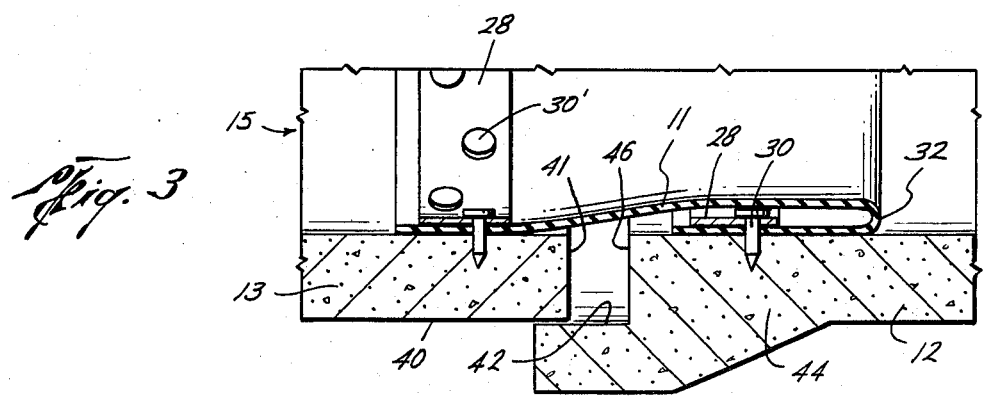
FIG. 3 is a view similar to FIG. 2 illustrating square faced mating members of the expansion joint.

As illustrated in FIG. 3, the conduits 12 and 13 are similar to the conduits of FIG. 1 and include a male section or end 40 and an end face 41 of an outer diameter substantially matching and mating the interior diameter of the inner wall 42 of female section 44 of the member 12. As further illustrated in FIG. 3, end 44 is of a larger exterior diameter than the female end 40 such that the circumferential flat face 46 will receive the end face 41 of male section 40 of member 13 when male section 40 is placed interiorly of the female member 44.

The flexible member 11 of FIG. 3 is secured in the same manner as the flexible member as illustrated in FIGS. 1 and 2, therefore, the flexible member 11 is secured by the bands 28 and anchors 30 and 30' and perform with the same function and manner as set forth hereinabove.

I claim:

1. An apparatus for preventing fluid leaks in joined pipe member and for enabling expansion of the joined pipe member while preventing such leaks, including:
   a. a first pipe member having a male end portion;
   b. a second pipe member having a female end portion for receiving said female end portion to form said joined pipe member;
   c. a flexible sealing member including
      i. a longitudinally expandable cover member having two ends,
      ii. a circumferentially sealing mounted band member securing one end of the cover member around said pipe member adjacent the female end portion of said second pipe member such that the cover member extends longitudinally away from the male end portion of said first pipe member,
      iii. a plurality of anchor members extending circumferentially around and through the female band member and one end of the cover member into said pipe member adjacent the female end portion,
      iv. a circumferentially sealing mounted band member securing the other end of the cover member around said pipe member adjacent the male end portion of said first pipe member after looping the cover member over the female end band member and anchor member to form a looped portion of the cover member,
      v. a plurality of anchor members extending circumferentially around and through the male end band member and the other end of the cover member into said pipe member adjacent the male end portion thereby permitting relative movement of the female and male ends until prevented from so doing by the one end of the cover member secured with the female end portion while preventing fluid leakage from between the female and male end portions in the joined pipe members.

2. The structure as set forth in claim 1 wherein said cover member, bands and anchors are positioned on the exterior of said first and second pipe members, respectively.

3. The structure as set forth in claim 1 wherein said cover member, bands and anchors are positioned on the interior of said first and second pipe members, respectively.

* * * * *